(12) United States Patent
Uh

(10) Patent No.: US 9,287,535 B2
(45) Date of Patent: Mar. 15, 2016

(54) SECONDARY BATTERY AND THE FABRICATION METHOD THEREOF

(75) Inventor: Hwa-Il Uh, Yongin-si (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 1779 days.

(21) Appl. No.: 11/657,629

(22) Filed: Jan. 25, 2007

(65) Prior Publication Data

US 2007/0190411 A1   Aug. 16, 2007

(30) Foreign Application Priority Data

Feb. 16, 2006   (KR) ........................ 10-2006-0014978

(51) Int. Cl.
*H01M 2/08*   (2006.01)
*H01M 2/04*   (2006.01)
*H01M 10/058*   (2010.01)

(52) U.S. Cl.
CPC .............. *H01M 2/08* (2013.01); *H01M 2/0426* (2013.01); *H01M 10/058* (2013.01); *Y10T 29/4911* (2015.01); *Y10T 29/49114* (2015.01)

(58) Field of Classification Search
None
See application file for complete search history.

(56) References Cited

U.S. PATENT DOCUMENTS

| | | | | |
|---|---|---|---|---|
| 4,804,593 A | * | 2/1989 | Hara et al. | ..................... 429/174 |
| 4,863,815 A | * | 9/1989 | Chang et al. | ..................... 429/94 |
| 2001/0041284 A1 | * | 11/2001 | Tsurutani et al. | ............... 429/56 |
| 2004/0096732 A1 | * | 5/2004 | Shin | .................... H01M 2/0277 |
| | | | | 429/61 |
| 2004/0115523 A1 | * | 6/2004 | Hommura et al. | ............ 429/144 |

FOREIGN PATENT DOCUMENTS

| | | |
|---|---|---|
| JP | 2004-079456 | 3/2004 |
| JP | 2004-273368 | 9/2004 |
| JP | 2005-149728 | 6/2005 |

* cited by examiner

*Primary Examiner* — Alix Eggerding
(74) *Attorney, Agent, or Firm* — Robert E. Bushnell, Esq.

(57) ABSTRACT

A secondary battery, which has no raw material injection spot and a burr on a lower surface of the insulating member. The sidewalls are formed on the opposite side to the side on which bending stress is applied, and the sidewalls act as a structural resistor, which result in preventing the plate from bending. The insulating member inserted into the container has an inversely stepped part to keep the insulating member from escaping from the container. A fabrication method of the secondary battery whereby an insulating member is prepared by inserting a raw material from the side on which the sidewall is to be formed into a mold and solidifying the inserted raw material, the insulating member is positioned over the electrode assembly inserted into a container, and a cap is coupled to an opening of the container with the insulating member positioned over the electrode assembly.

8 Claims, 4 Drawing Sheets

SECONDARY BATTERY AND THE FABRICATION METHOD THEREOF

CROSS-REFERENCE TO RELATED APPLICATION AND CLAIM OF PRIORITY

This application claims priority to and the benefit of Korean Patent Application No. 10-2006-0014978, filed on Feb. 16, 2006 the entire content of which is incorporated herein by reference

BACKGROUND

1. Field of the Invention

The invention relates to a secondary battery and the fabrication method thereof, and more particularly, to a secondary battery and the fabrication method thereof which improves the efficiency of feeding of an insulating member to the inside of a container, suppresses the occurrence of the bend of the insulating member, and prevents the insulating member inserted into the inside of the container from escaping from the container.

2. Discussion of Related Art

Generally, secondary batteries are rechargeable and dischargeable batteries which are different from the non-rechargeable primary batteries, and are widely used in high technology electronic devices, such as cellular phone, notebook computer, camcorder, etc. In particular, the use of a lithium secondary battery has rapidly increased because it has an operating voltage of 3.6V which is 3 times as high as that of nickel-cadmium battery or a nickel-hydrogen battery used as a power supply for an electronic device, and it has a high energy density per weight.

The lithium secondary battery generally uses a lithium-based oxide as a positive electrode active material and a carbon material as a negative electrode active material. Furthermore, the lithium secondary battery has been made in various shapes of which typical configurations are cylindrical, polygonal and pouched shapes.

The polygonal secondary battery includes an electrode assembly, a can receiving the electrode assembly and a cap coupled with the can.

The electrode assembly includes the positive electrode, the negative electrode and a separator interposed between the positive electrode and the negative electrode, and the electrode assembly is jelly-roll wound, and positive electrode tab and negative electrode tab protrude from the positive electrode and the negative electrode, respectively.

In the polygonal secondary battery, the can has a rectangular parallelepiped shape made of metal, and is formed by a processing method such as a deep drawing method.

The cap includes a cap plate coupled with the upper part of the can, an electrode terminal which is mounted through a hole of a terminal and is provided on its outer surface with a gasket for insulating from the cap plate, an insulating plate mounted on the underside of the cap plate, and a terminal plate which is mounted on the underside of the insulating plate and is electrically connected with the electrode terminal.

One electrode of the electrode assembly is electrically connected to the electrode terminal via the electrode tab and the terminal plate, and the other electrode is electrically connected to the cap plate or the can via the electrode tab coupled thereto.

In addition, an insulating member can also be provided on the lower part of the terminal plate. The insulating member serves for insulating between the electrode assembly and the cap.

However, there are problems in the conventional insulating member as follows:

First, the injection of the raw material for the conventional insulating member takes place, upon considering the plate as a reference, in the opposite side to the side on which sidewalls are to be formed. Namely, if the sidewalls of the insulating member are extended upwardly in the plate, then the injection of the raw material takes place toward the plate in the lower side of the plate. Thus, "a spot of injecting the raw material" leaves which is defined as a spot formed after the raw material is injected onto the lower surface of the plate. In this spot, a burr which refers to a raised potion formed on the lower surface of the plate after the raw material is injected onto the lower surface of the plate is formed. Accordingly, when an injection-molded insulating member is inserted into the inside of the can by a feeding machine and positioned over the electrode assembly, the insulating member has to be positioned in the target position so that the feeding machine can grasp well the insulating member, however, the lower surface of the plate cannot be maintained flat by the burr formed thereon, and thus the insulating member cannot be positioned in place and can be moved. That is, a problem is arisen that the grasping of the insulating member by the feeding machine becomes difficult due to the scattering of the position of the insulating member, and thus the feeding efficiency is lowered. In order to solve this problem, a burr protruded from the lower surface of the plate has to be removed, which necessitates a separate process, time and cost.

Second, a remaining heat still remains in the insulating member separated from the mold after the solidification, and thus a contractile stress is produced therein. That is, since the injection of the raw material for the conventional insulating member takes place, upon considering the plate as a reference, in the opposite side to the side on which sidewalls are to be formed, a problem is arisen that the insulating member is bent in the direction opposite to that of injecting the raw material.

Third, upon inserting the insulating member into the inside of the can, it is necessary to take measures in order that the insulating member cannot be escaped out of the can during the fabrication process of the secondary battery. For this purpose, a method is conceivable that an inversely stepped can having the periphery of the upper inner wall which is longer than the periphery of the lower inner wall is used so that the sidewalls of the inserted insulating member can be caught on the inversely stepped part of the can and cannot be escaped out of the can. However, the plate makes an acute angle with the outer surface of the sidewalls. In case that the plate makes a right angle with the outer surface of the sidewalls, it is difficult to separate downwardly the lower case with respect to the upper case without damage of the insulating member, and thus the plate should makes an acute angle with the outer surface of the sidewalls. Accordingly, a case that the sidewalls of the insulating member inserted into the inside of the can cannot be caught on the inversely stepped part of the can is occurred, a problem that the insulating member escapes out of the can is arisen.

SUMMARY OF THE INVENTION

Accordingly, the present invention has been made to solve at least one of the above-mentioned problems or other problems occurring in the prior art.

An object of the invention is to improve the efficiency at which the insulating member is inserted into the inside of the can and rested safely thereon when assembling the insulating member during the fabrication process of the battery.

Another object of the invention is to suppress the bend of the insulating member due to the contractile stress after the fabrication of the insulating member.

Another object of the invention is to prevent the insulating member inserted into the inside of the can and rested safely thereon from escaping from the can, and thus to prevent the assembling inferiority.

At least one of the proceeding objects or another object is met, in whole or in part, by the present invention.

According to an aspect of the invention, a secondary battery includes: an electrode assembly comprising a first electrode, a second electrode, and a separator interposed between the first electrode and the second electrode; a container receiving the electrode assembly, the container having an opening; a cap coupled with the opening of the container; and an insulating member mounted between the electrode assembly and the cap, a spot of injecting raw material being disposed in the side of the insulating member facing to the electrode assembly.

According to another aspect of the present invention, a secondary battery, comprises: an electrode assembly comprising a first electrode, a second electrode, and a separator interposed between the first electrode and the second electrode; a container receiving the electrode assembly, the container having an opening; a cap coupled with the opening of the container; and an injection-molded insulating member mounted between the electrode assembly and the cap, the insulating member comprising a plate and a sidewall protruding from the plate in a direction toward the cap, the plate making an obtuse angel with the outer surface of the sidewall, a spot of injecting raw material being disposed in the side of the insulating member facing to the electrode assembly.

According to another aspect of the present invention, a fabrication method of a secondary battery comprises: preparing an electrode assembly; inserting the electrode assembly into a container; preparing an insulating member by inserting a raw material into a mold from the side of the insulating member to be faced with the electrode assembly, solidifying the inserted raw material, and removing the solidified material from the mold; positioning the insulating member over the electrode assembly; coupling a cap to an opening of the container with the insulating member positioned over the electrode assembly.

BRIEF DESCRIPTION OF THE DRAWINGS

A more complete appreciation of the present invention, and many of the above and other features and advantages of the present invention, will be readily apparent as the same becomes better understood by reference to the following detailed description when considered in conjunction with the accompanying drawings in which like reference symbols indicate the same or similar components, wherein.

DETAILED DESCRIPTION OF PREFERRED EMBODIMENTS

Hereinafter, preferred embodiments of the invention will be described in detail with reference to FIGS. 1 to 6.

Figure 1:
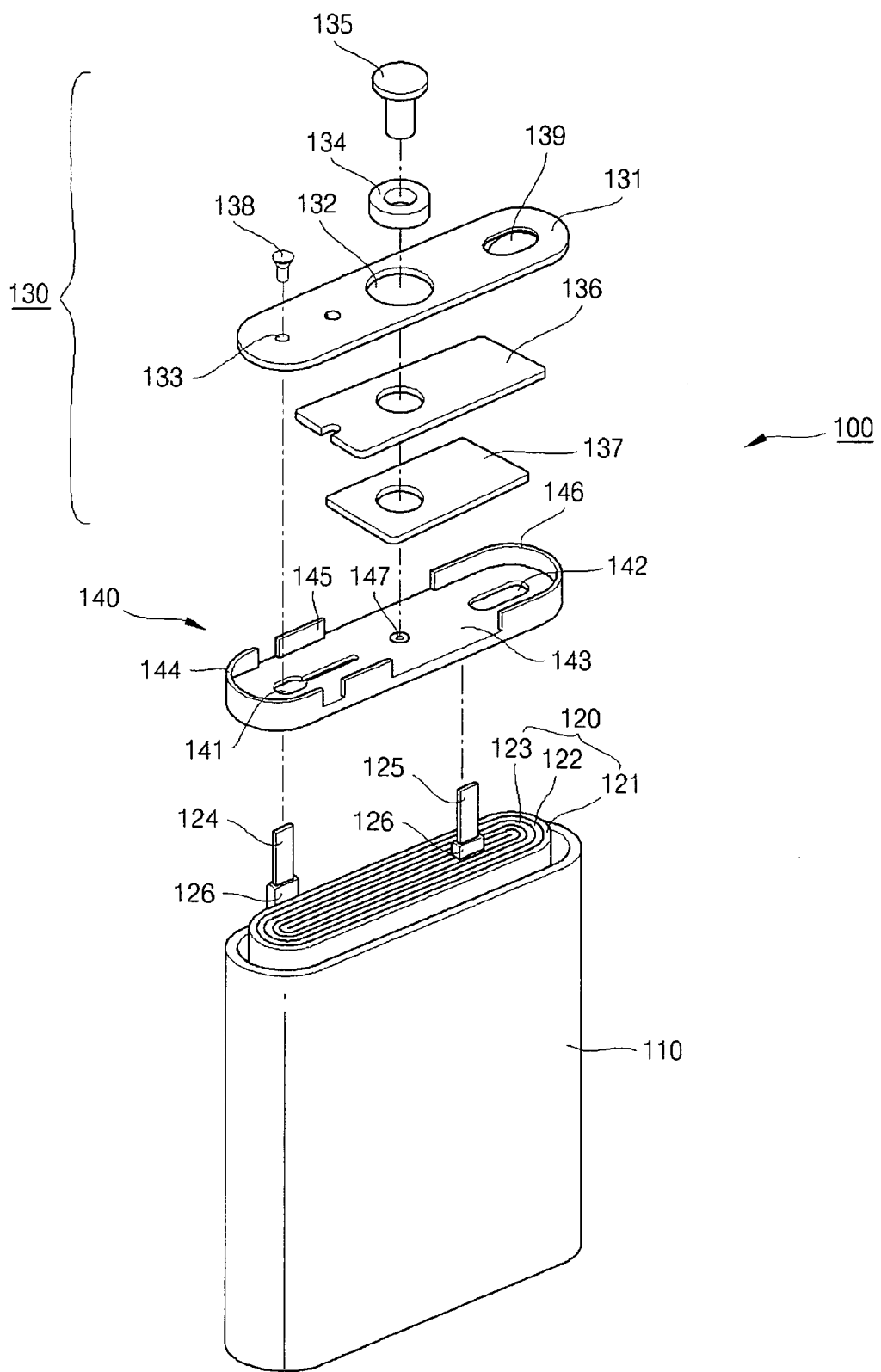
FIG. 1 is an exploded perspective view of a secondary battery according to an embodiment of the invention.

FIG. 1 is an exploded view illustrating a secondary battery according to a preferred embodiment of the invention.

A secondary battery 100 comprises an electrode assembly 120 which is accommodated in a container (preferably a can) 110, a cap 130 connected to the top of the opening of the can 110 in a state where the electrode assembly 120 is accommodated in the can 110 and an insulating member 140 interposed between the electrode assembly 120 and the cap 130 for insulating them.

The electrode assembly 120 is preferably obtained by forming a positive electrode 121 and a negative electrode 123 which have plate shapes so as to increase electric capacity, and interposing a separator 122 between the positive electrode 121 and the negative electrode 123 to be laminated and winding them in the form of a vortex to be formed so-called "Jelly Roll." The negative electrode 123 and the positive electrode 121 are formed by coating current collectors formed of each copper and aluminum foil with a negative electrode active material such as carbon and a positive electrode active material such as $LiCoO_2$, respectively. The separator 122 may be composed of polyethylene, polypropylene, or co-polymer of polyethylene and polypropylene, but not limited thereto. It is preferable that the separator 122 has width wider than that of the positive and negative electrodes 121, 123 to prevent a short circuit between electrodes. Positive and negative electrode tabs 124, 125 connected to each electrode protrude from the electrode assembly 120. The positive and negative electrode tabs 124, 125 that protrude toward outside of the electrode assembly 120. An insulating tape 126 is wound around a boundary for insulating the electrodes 121, 123 from each other.

The container 110, as shown in FIG. 1, is preferably a can which has a rectangular parallelepiped shape made of metal, and is formed by a processing method comprising a deep drawing method and so forth. Therefore, the can itself may act the role of a terminal. It is preferable that the material of the can is aluminum or aluminum alloy which is light-weight conductive metal. The container 110 contains electrolyte, and the opening of the container is sealed up with the cap 130.

The cap 130 is composed of a cap plate 131, an insulating plate 136 and a terminal plate 137. A terminal through-hole 132 is formed in the cap plate 131, and an electrode terminal 135 is inserted into the terminal through-hole where a gasket 134 is positioned around exterior surface of the electrode terminal. The cap plate 131 has an insulating plate 136 formed on the lower surface thereof, and the insulating plate 136 has the terminal plate 137 formed on the lower surface thereof. This terminal plate is electrically connected to the bottom of the electrode terminal 135.

The negative electrode 123 of the electrode assembly is electrically connected to the electrode terminal 135 via the negative electrode tab 125 and the terminal plate 137. In the case of the positive electrode 121 of the electrode assembly 120, the positive electrode tab 124 is joined, preferably welded, to the cap plate 131 or the container 110. On the other hand, the battery can be designed with a different polarity.

The insulating member 140 is installed between the cap 130 and the electrode assembly 120 to insulate the cap 130 and the electrode assembly 120 from each other.

A vent 139 is formed on one side of the cap plate 131, and the vent 139 secures the safety of the battery by releasing internal gas when the internal pressure of the battery has increased due to overcharge and so on. This vent 139 is a part formed thinner than other parts, therefore, if the internal pressure is increased, the vent is broken prior to others, and thus, releases internal gas. An injection hole 133 is formed on the other side of the cap plate 131 for injecting the electrolyte into the container 110, and a seal 138 for sealing up the electrolyte hole is provided therein after injecting the electrolyte.

More particular description relating to the shape of the insulating member 140 is as follows.

Figure 2:
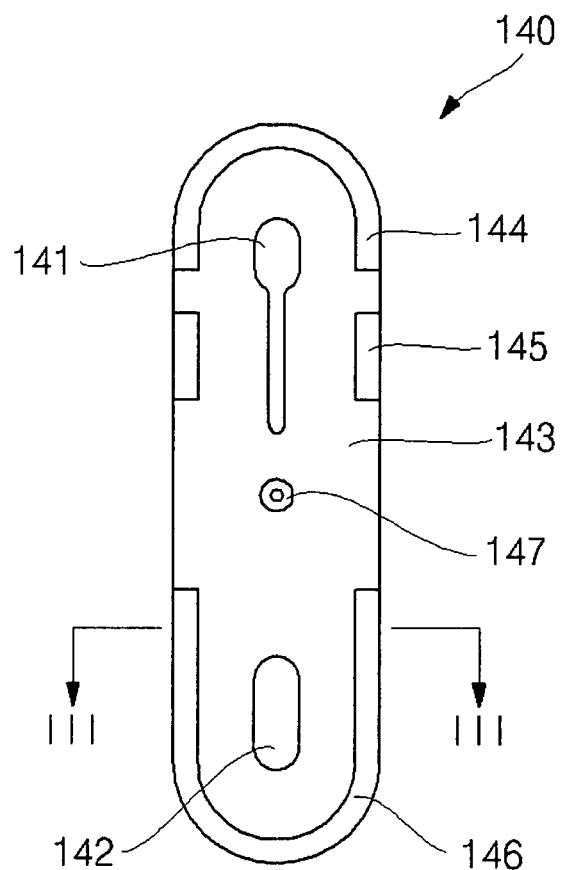
FIG. 2 is a plan view of a secondary battery according to an embodiment of the invention.
Figure 3:
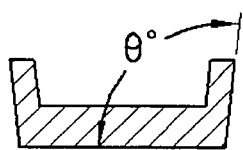
FIG. 3 is a sectional view taken along the line III-III of FIG. 2.
Figure 4:
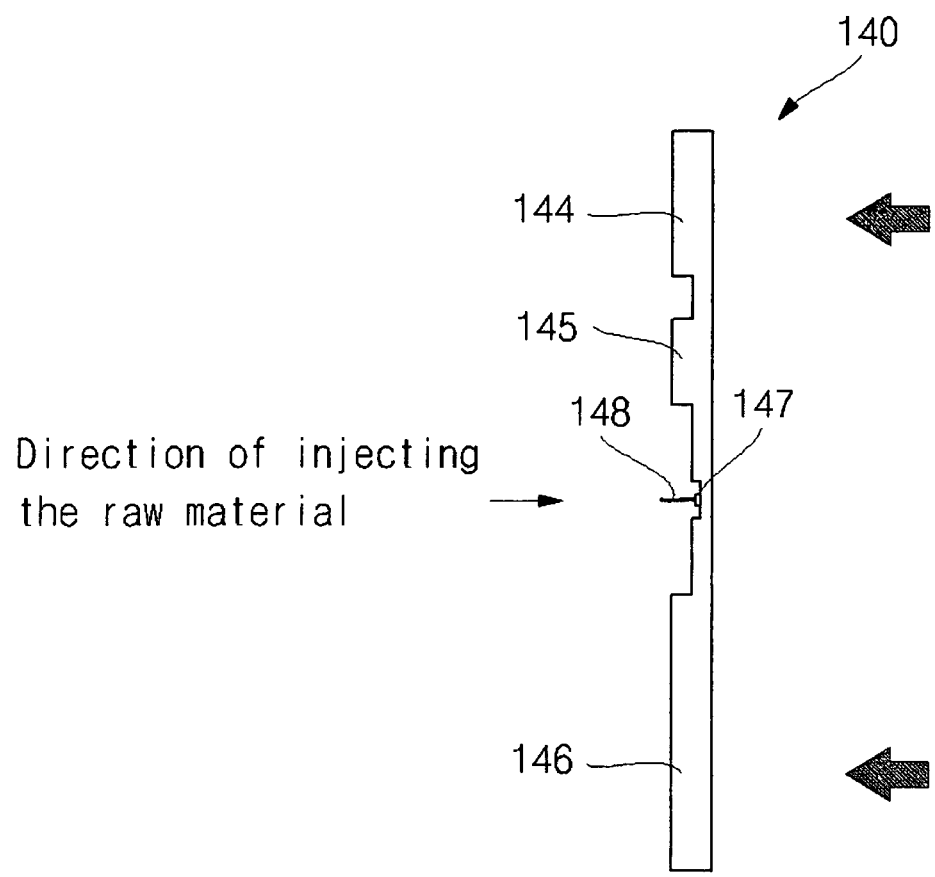
FIG. 4 shows the direction of injecting the raw material upon fabricating an insulating member according to an embodiment of the invention and the direction of the contractile stress after the fabrication.

FIG. 2. is a plan view of a secondary battery according to an embodiment of the invention, FIG. 3 is a sectional view taken along the line III-III of FIG. 2, FIG. 4 is a side view of FIG. 3 and shows a sectional view of a mold for fabricating an insulating member according to an embodiment of the invention and the shape of the cavity corresponds to that of the insulating member of FIG. 3. Furthermore, FIG. 4 is a sectional view of the insulating member which is inserted into the container.

Referring to FIG. 2, the second battery has a spot to which the raw material is injected, that is a raw material injection spot 147. More particularly, the insulating member 140 is provided with a plate 143 which forms the bottom of the case and sidewalls 144 to 146 extending upwardly, and the raw material injection spot 147 remains on the upper surface of the plate 143. On the other hand, tab through-holes 141, 142 protruded from the electrode assembly are formed in the plate 143.

Figure 5:
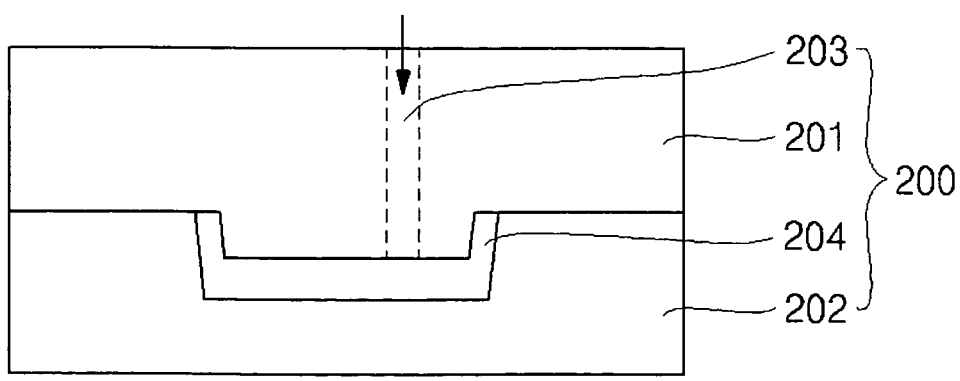
FIG. 5 is a sectional view of a mold for fabricating an insulating member according to an embodiment of the invention.

In this case, the raw material injection spot is a spot which shows specific position to which the raw material injected. As shown in FIG. 4 and 5, if the raw material is injected in the cavity 204 and solidified, there is the spot unless additional surface processing takes place.

Contrary to the conventional insulating member which the raw material injection is done on the opposite side to the side on which sidewalls are to be formed, an embodiment of the present invention injects the raw material on the side on which the sidewalls are to be formed, and thus, the raw material injection spot 147 remains on the upper surface of the insulating member 140, more particularly on the upper surface of the plate 143. 'On the upper surface of the insulating member' means 'in the opposite side to a resting surface facing the electrode assembly'.

A burr 148, a potion of the raw material is protruded and solidified, may be formed on the raw material injection spot 147. It could be happen during the last stage of injecting the raw material and so on. According to an embodiment of the invention, the burr is formed on the upper surface of the plate contrary to the conventional insulating member in which the burr is formed on the lower surface. That is, the lower surface of the insulating member is flat without protrusions.

Therefore, if the injection-molded insulating member is inserted into the container by a feeding machine, the insulating member will not be moved and will remain exactly on the target position. Therefore, the feeding machine holds the insulating member firmly, and thus the efficiency of feeding will be increased.

Furthermore, there is no need additional processing to remove the burr 148 which is protruded and formed on the lower surface, which results in time and cost reduction.

Meanwhile, a contractile stress is generated, because there is a remaining heat in the insulating member which is drawn after the solidification. According to an embodiment of the invention, as shown in FIG. 4, the raw material injection is done on the side on which sidewalls are to be formed, and thus, bending stress is generated in the opposite direction (in the direction of the arrow "A") opposite to that of injection direction. However, in the case of the insulating member according to an embodiment of the invention, the sidewalls are formed on the opposite side to the side on which bending stress is to be generated and act as a structural resistor, which result in preventing the plate from bending. Therefore, the lower surface of the plate can be kept flat.

Referring to the injection-molded processing taken in conjunction with FIG. 5, the molten raw material is injected in the direction of arrow via the raw material injection line 203, in a state where a fixed upper case 201 and an upwardly and downwardly movable lower case 202 contact with each other. Thermoplastic material can be used as a raw material. Preferably, a propylene resin can be used as a raw material. A central region is protruded on the upper case 201 and a recess is formed on the lower case 202. The raw material is filled in the cavity 204 formed by contacting the upper case 201 and the lower case 202 to each other. After solidifying the raw material, the lower case 202 is separated from the upper case 201 downwardly, and the desired-shape insulating member can be obtained by drawing the complete insulating member from the upper case 201.

It is preferable that an angle (θ) between the plate 143 according to an embodiment of the invention and the outer surface of the sidewalls 144 to 146 formed on the upper surface of the plate 143 is an obtuse angle. An angle between the plate and the inner surface of the sidewalls is more than approximately 90 degrees. This makes it possible to separate the insulating member 140 from the mold 200 after the solidification with ease.

Figure 6:
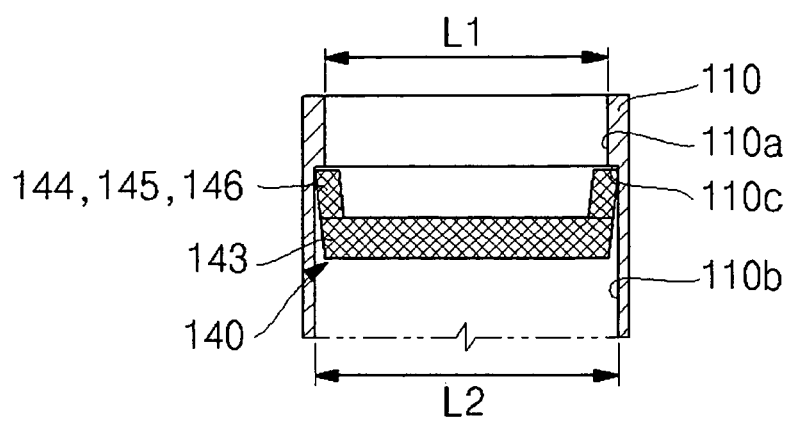
FIG. 6 is a partial sectional view of a container after an insulating member according to an embodiment of the invention is inserted into the inside of the container.

When this insulating member is inserted into the container, certain measures need to be done so as to prevent the insulating member from escaping from the container. With reference to FIG. 6, the inner wall of the container has a stepped part. In other words, the opening of the container is a stepped opening, which has a first opening portion and a second opening portion, and the second opening portion is wider than the first opening portion. For example, a diameter L2 of the lower part inner wall 110b is larger than a diameter L1 of the upper part inner wall 110a. Further, an angle between the plate 143 and the outer surface of the sidewalls 144 to 146 is an obtuse angle, therefore, an inversely stepped part 110c is positioned in the inner wall of the container 110 for plugging the upper surface of the sidewalls 144 to 146 of the insulating member 140 into the inversely stepped part 110c.

Therefore, once the insulating member 140 is inserted into the container 110, the insulating member cannot escape out of the container, because the sidewalls 144 to 146 are caught by the inversely stepped part 110c.

A detailed description of an embodiment of a fabrication method of the secondary battery which has above-explained structure will now be described, however, the overlapped description will be omitted.

First, the electrode assembly 120 is fabricated. The structure and component of the electrode assembly is as explained above.

Further, the electrode assembly 120 is received in the container 110 of which the upper part is open.

In addition, the insulating member 140 is positioned over the electrode assembly 120 in a state where the electrode assembly is received in the container 110. The insulating member 140 is injection-molded to have the plate 143 which forms the bottom and sidewalls 144 to 146 which are extending in one direction from the edge of the plate 143. In the injection-molding process, the raw material of the insulating member is injected from the side on which the sidewalls are to be formed.

Further, the cap 130 is coupled to the container 110 from the upper side of the insulating member 140.

With reference to a secondary battery and a fabrication method thereof according to an embodiment of the invention, first, a lower surface of an insulating member is flat and will not be moved, because a raw material injection spot and a burr is on a upper surface of the insulating member, and thus, a feeding efficiency at which the insulating member is inserted into the container by a feeding machine will be increased. Furthermore, there is no need to carry out additional surface processing to remove the protruded burr, which results in time and cost reduction.

Second, the sidewalls are formed on the opposite side to the side on which bending stress is applied, and the sidewalls act as a structural resistor, which result in preventing the plate from bending, and thus, the lower surface of the plate can be kept flat.

Third, the insulating member inserted into the container will not escape out of the container, because the sidewalls are caught by the inversely stepped part.

While the present invention has been described in detail with reference to the exemplary embodiments thereof, it should be understood to those skilled in the art that various changes, substitutions and alternations can be made hereto without departing from the scope of the invention as defined by the appended claims.

What is claimed is:

1. A secondary battery, comprising:
an electrode assembly comprising a first electrode, a second electrode, and a separator interposed between the first electrode and the second electrode;
a container receiving the electrode assembly, the container having an opening;
a cap coupled with the opening of the container, the cap comprising a terminal plate, an insulating plate, a cap plate, a gasket and an electrode terminal electrically connected to one of the first and second electrodes, the terminal plate comprising a first through-hole which is aligned with the electrode terminal;
a first electrode tab electrically connected to the first electrode and a second electrode tab electrically connected to the second electrode, the first and second electrode tabs protruding from the electrode assembly towards the cap; and
an insulating member mounted between the electrode assembly and the cap and the insulating member being in contact with the terminal plate, a spot for injecting raw material being disposed in a first side of the insulating member opposite to a second side of the insulating member facing to the electrode assembly, the spot being exposed by the first through-hole and facing directly to the electrode terminal through the first through-hole, the insulating member comprising a second through-hole through which the first electrode tab passes and a third through-hole through which the second electrode tab passes,
wherein the insulating member comprises a plate and a sidewall extending upwardly from an edge of the plate in a direction toward the cap and the plate makes an obtuse angle with an outer surface of the sidewall,
wherein the opening of the container has an inversely stepped cross-sectional profile along an inner wall of the container, and the inversely stepped profile comprises an upper side including an upper inner wall and a lower side including a lower inner wall, with the upper inner wall having a diameter that is smaller than a corresponding diameter of the lower inner wall, and
wherein an uppermost part of the sidewall of the insulating member is positioned in a lower side of the inversely stepped profile to keep the insulating member from escaping from the container, an entirety of the insulating member is positioned within the lower side of the inversely stepped profile.

2. The secondary battery as claimed in claim 1, wherein the insulating member is an injection-molded insulating member having a burr on the spot for injecting the raw material.

3. The secondary battery as claimed in claim 1, wherein a lower surface of the plate is flat.

4. A secondary battery, comprising:
an electrode assembly comprising a first electrode, a second electrode, and a separator interposed between the first electrode and the second electrode;
a container receiving the electrode assembly, the container having an opening;
a cap coupled with the opening of the container, the cap comprising a terminal plate, an insulating plate, a cap plate, a gasket and an electrode terminal electrically connected to one of the first and second electrodes, the terminal plate comprising a first through-hole which is aligned with the electrode terminal;
a first electrode tab electrically connected to the first electrode and a second electrode tab electrically connected to the second electrode, the first and second electrode tabs protruding from the electrode assembly towards the cap; and
an injection-molded insulating member mounted between the electrode assembly and the cap and the injection-molded insulating member being in contact with the terminal plate, the insulating member comprising a plate and a sidewall protruding from the plate in a direction toward the cap, the plate making an obtuse angle with an outer surface of the sidewall, a spot for injecting raw material being disposed in a first side of the insulating member opposite to a second side of the insulating member facing to the electrode assembly, the spot being exposed by the first through-hole and facing directly to the electrode terminal through the first through-hole, the injection-molded insulating member comprising a second through-hole through which the first electrode tab passes and a third through-hole through which the second electrode tab passes,
wherein the opening of the container has an inversely stepped cross-sectional profile along an inner wall of the container, and the inversely stepped cross-sectional profile comprises an upper side including an upper inner wall of the opening and a lower side including a lower inner wall of the opening, the upper inner wall of the opening having a cross-sectional dimension that is smaller than a corresponding cross-sectional dimension of the lower inner wall of the opening, and
wherein an uppermost part of the sidewall of the insulating member is positioned in a lower side of the inversely stepped profile to keep the insulating member from escaping from the container, an entirety of the insulating member is positioned within the lower side of the inversely stepped profile.

5. The secondary battery as claimed in claim 4, wherein the insulating member has a bun on the spot for injecting the raw material.

6. A fabrication method of a secondary battery, comprising:
preparing an electrode assembly, the electrode assembly comprising a first electrode, a second electrode, and a separator interposed between the first electrode and the second electrode;
preparing a first electrode tab electrically connected to the first electrode and a second electrode tab electrically connected to the second electrode, the first and second electrode tabs protruding away from the electrode assembly;
inserting the electrode assembly into a container;
preparing an insulating member by injecting a raw material into a mold from a first side of the insulating member opposite to a second side of the insulating member to be faced with the electrode assembly, solidifying the inserted raw material, and removing the solidified material from the mold, the insulating member comprising a first through-hole through which the first electrode tab passes and a second through-hole through which the second electrode tab passes;
positioning the insulating member over the electrode assembly; and
coupling a cap to an opening of the container with the insulating member positioned over the electrode assembly, the cap comprising a terminal plate, an insulating plate, a cap plate, a gasket and an electrode terminal electrically connected to one of the first and second electrodes, the terminal plate comprising a third through-hole which is aligned with the electrode terminal, the terminal plate being in contact with the insulating member,
wherein the injection of the raw material forms a spot on the first side of the insulating member, and the spot is exposed by the third through-hole and faces directly to the electrode terminal through the third through-hole,
wherein the insulating member comprises a plate and a sidewall protruding from the plate, and the raw material is injected from the side of the insulating member opposite to the side of the insulating member on which the sidewall of the insulating member is to be formed, and the plate makes an obtuse angle with the outer surface of the sidewall,
wherein the opening of the container has an inversely stepped cross-sectional profile along an inner wall of the container, and the inversely stepped cross-sectional profile comprises an upper side including an upper inner wall of the opening and a lower side including a lower inner wall of the opening, the upper inner wall of the opening having a cross-sectional dimension that is smaller than a corresponding cross-sectional dimension of the lower inner wall of the opening, and
wherein an uppermost part of the sidewall of the insulating member is positioned in a lower side of the inversely stepped profile to keep the insulating member from escaping from the container, an entirety of the insulating member is positioned within the lower side of the inversely stepped profile.

7. The fabrication method of claim 6, wherein the mold comprises an upper case having a central region protruded toward the lower case and a lower case having a recess comprised of a flat portion and a sidewall, the central region of the upper case and the recess of the lower case form a cavity having a shape of the insulating member when the upper case and the lower case contact each other, and the raw material is injected through an injection line formed in the upper case.

8. The secondary battery fabricated by the method of claim 6.

* * * * *